US009643815B2

(12) United States Patent
Wei

(10) Patent No.: US 9,643,815 B2
(45) Date of Patent: May 9, 2017

(54) ADJUSTABLE SAFETY BRAKE

(75) Inventor: Wei Wei, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 14/235,526

(22) PCT Filed: Jul. 29, 2011

(86) PCT No.: PCT/US2011/045927
§ 371 (c)(1), (2), (4) Date: Jan. 28, 2014

(87) PCT Pub. No.: WO2013/019183
PCT Pub. Date: Feb. 7, 2013

(65) Prior Publication Data

US 2014/0158476 A1 Jun. 12, 2014

(51) Int. Cl.

| | |
|---|---|
| ***F16D 55/08*** | (2006.01) |
| ***B66B 1/32*** | (2006.01) |
| ***B66B 5/22*** | (2006.01) |
| ***B66B 5/00*** | (2006.01) |
| *F16D 65/00* | (2006.01) |

(52) U.S. Cl.
CPC .................. *B66B 1/32* (2013.01); *B66B 5/00* (2013.01); *B66B 5/22* (2013.01)

(58) Field of Classification Search
CPC .... B66B 1/32; B66B 5/00; B66B 5/02; B66B 5/16; B66B 5/18; B66B 5/22; F16D 55/00; F16D 55/02; F16D 51/60
USPC ..................... 188/2 D, 72.1, 72.2, 72.7, 73.1
See application file for complete search history.

(56) References Cited

U.S. PATENT DOCUMENTS

| | | | | |
|---|---|---|---|---|
| 4,042,069 | A * | 8/1977 | Ohira | B66B 1/32 187/296 |
| 5,096,020 | A * | 3/1992 | Korhonen | 187/376 |
| 6,719,101 | B2 * | 4/2004 | Hugel | 187/376 |
| 7,036,638 | B2 | 5/2006 | Simonds et al. | |
| 7,575,099 | B2 * | 8/2009 | Oh et al. | 187/286 |
| 7,806,242 | B2 * | 10/2010 | Lehmann | B61H 7/086 188/165 |
| 8,186,483 | B2 * | 5/2012 | Sirigu et al. | 187/366 |
| 2003/0085078 | A1 | 5/2003 | Simmonds et al. | |
| 2008/0128218 | A1 | 6/2008 | Gremaud et al. | |
| 2014/0041967 | A1 * | 2/2014 | Wei | 187/350 |

FOREIGN PATENT DOCUMENTS

| | | | |
|---|---|---|---|
| CN | 1960931 | A | 5/2007 |
| CN | 101927929 | A | 12/2010 |
| DE | 3739654 | A1 | 6/1989 |
| DE | 3934492 | A1 | 4/1990 |

(Continued)

OTHER PUBLICATIONS

International Search Report; PCT/US2011/045927; date of mailing Feb. 9, 2012.

(Continued)

*Primary Examiner* — Melody Burch
(74) *Attorney, Agent, or Firm* — Cantor Colburn LLP

(57) ABSTRACT

A brake device having a block member, a first and second brake member movable relative to each other, and at least one adjustment member positioned between the block member and the first brake member to adjust the distance there between.

6 Claims, 5 Drawing Sheets

(56) References Cited

FOREIGN PATENT DOCUMENTS

| | | | |
|---|---|---|---|
| EP | 1167269 | A1 | 1/2002 |
| JP | 2006064555 | A | 3/2006 |
| JP | 2008303014 | A | 12/2008 |
| WO | WO2008057116 | A1 | 5/2008 |

OTHER PUBLICATIONS

IPRP PCT/US2001/045927; date of issuance Feb. 4, 2014 and PCT Written Opinion date of mailing Feb. 9, 2012.
Patent Cooperation Treaty; PCT/US2011/045927; date of mailing Feb. 9, 2012.
PCT International Preliminary Report on Patentability and Written Opinion of the International Searching Authority for International Application No. PCT/US2011/045927, Feb. 13, 2014, 7 pages.
Extended European Search Report for application EP 11870258.8, dated Mar. 11, 2015, 6 pages.
Japanese Office Action for application JP 2014522801, dated Feb. 20, 2015, 2 pages.

* cited by examiner

ADJUSTABLE SAFETY BRAKE

BACKGROUND

Elevator systems include a variety of control devices to maintain control over movement of the elevator car. A motor causes desired movement of the elevator car to carry passengers to their intended destinations. A brake associated with the motor prevents the elevator car from moving when it is stopped at a landing requested by a passenger, for example. The brake associated with the motor is used to limit the movement or speed of the elevator car under most conditions.

It is possible for an elevator car or counterweight to move at a speed greater than the desired speed. Elevator systems include auxiliary brakes, sometimes referred to as safeties, for stopping the elevator car if it is travelling at a faster speed than desired. Elevator safeties are typically designed to stop the elevator car with a certain deceleration based on the assumption that the car has a full load. When the safeties engage and there are only a few passengers in the car, the deceleration of the car is much greater because the car is much lighter than the fully loaded case. This higher deceleration can cause an unpleasant or even harsh stop for the passengers inside the car.

SUMMARY

The present invention is directed to the adjustment of a braking device. According to one aspect of the invention, the braking device has a block member and a first and second brake member movable relative to each other. The first brake member is secured to the block member, and the location of the block member relative to the first brake member can be adjusted by inserting an adjustment member between the block member and first brake member.

Alternatively, in this or other aspects of the invention, the braking device could be an asymmetrical safety, such as is used in an elevator system.

Alternatively, in this or other aspects of the invention, the first brake member could be a fixed wedge.

Alternatively, in this or other aspects of the invention, the braking device may also comprise an adjustment control device which controls the displacement of the adjustment member relative to the first brake member.

Alternatively, in this or other aspects of the invention, the adjustment control device receives a signal and controls the displacement of the adjustment member based on the signal.

Alternatively, in this or other aspects of the invention, the signal sent to the adjustment control device is responsive to load.

According to yet another aspect of the invention, a method for adjusting the braking force of a braking device having a block member and a first brake member comprises receiving a signal responsive to a load, and then adjusting the location of the adjustment member between the block member and first brake member.

Alternatively, in this or other aspects of the invention, the method may include a step of determining a load. Additionally, this determination of the load may occur before each run of an elevator system.

According to yet another aspect of the invention, the braking device is an elevator safety comprising a block, a fixed wedge, and an adjustment member located between the block and first brake member.

DETAILED DESCRIPTION

Figure 1:
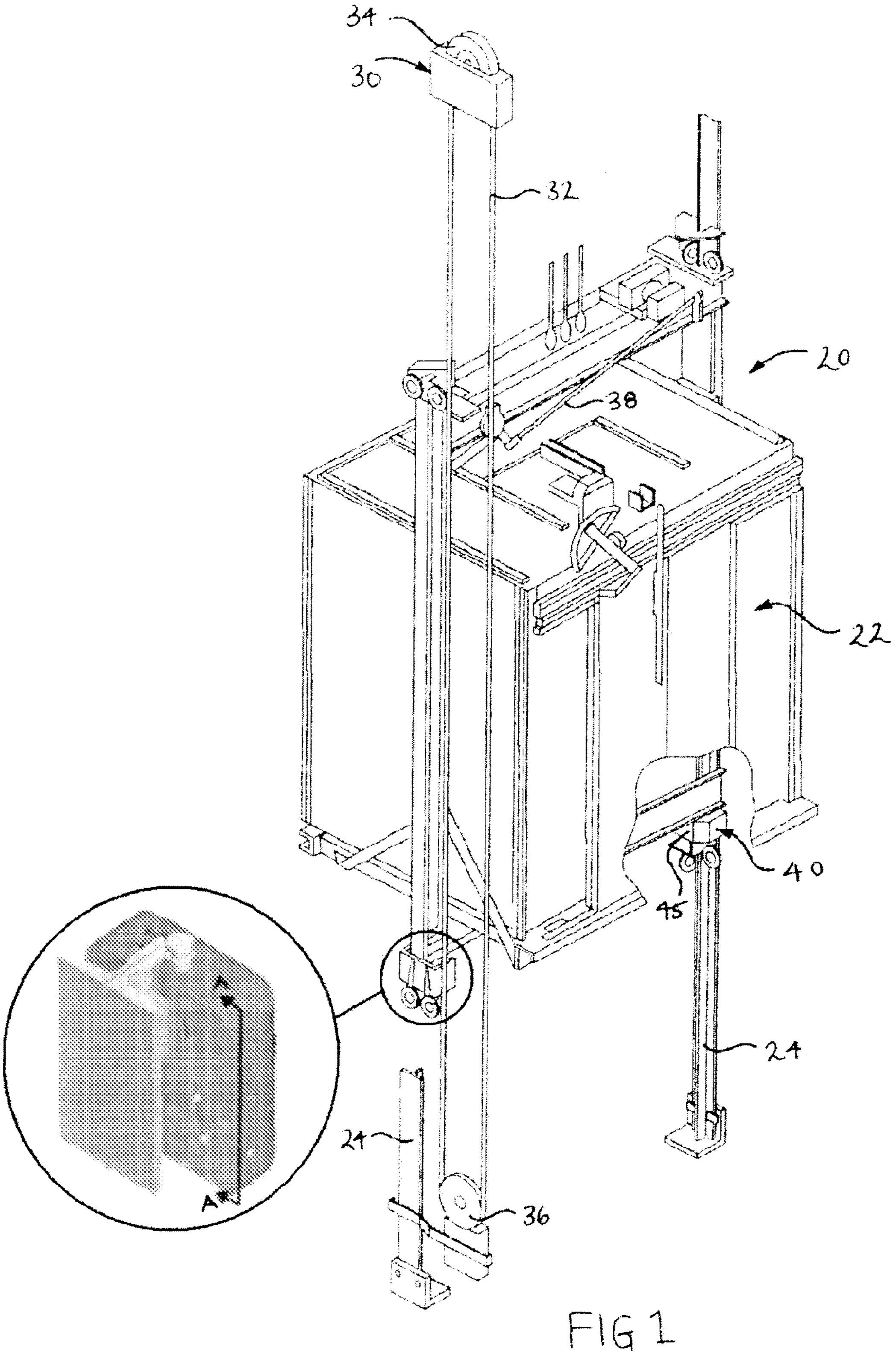
FIG. 1 schematically illustrates selected portions of an elevator system including a braking system

FIG. 1 schematically illustrates an example elevator system 20 having an elevator car 22 that moves along guide rails 24 in a known manner using ropes 32. A governor device 30 prevents the elevator car 22 from exceeding a maximum speed. The example governor device 30 includes a governor rope 32 that travels with the elevator car 22. A governor sheave 34 and a tension sheave 36 are located at opposite ends of a loop formed by the governor rope 32.

The illustrated governor device 30 operates in a known manner. In the event that the elevator car 22 moves too quickly, the governor device 30 trips and exerts a braking force on the governor sheave 34, which causes the governor rope 32 to pull up on a mechanical linkage 38 to activate braking devices 40 supported on elevator car 22. The braking devices 40 apply a braking force to the guide rail 24 to prevent further movement of the elevator car 22.

Figure 2:
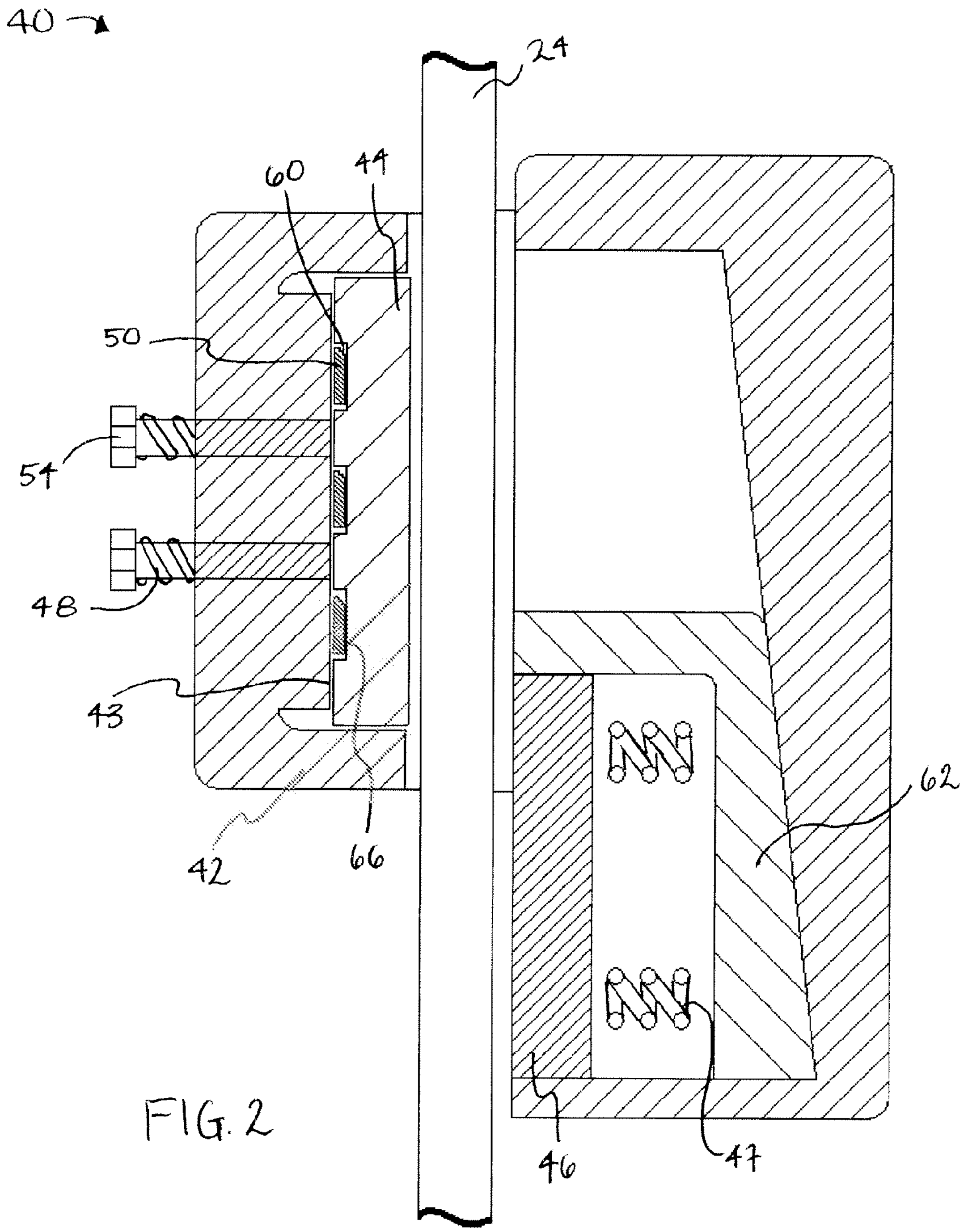
FIG. 2 illustrates an exemplary cross section of an braking device taken along plane A-A in one embodiment of this invention

FIG. 2 illustrates an example of a cross section of a braking device 40 taken along plane A-A. The braking device 40 has a first brake member 44, a block member 42, and a second brake member 46. In one embodiment of the invention, the elevator braking device is a safety, more specifically an asymmetrical safety. The first brake member 44 is a fixed wedge, and the second brake member 46 is a sliding wedge. The second brake member 46, is connected to a jaw 62 via at least one biasing member 47. The jaw 47 is slidably engaged with an angled edge of the housing 64. The braking device 40 has a housing 45 configured to be fixedly connected to the elevator car 22 (see FIG. 1). At least one fastener 54 secures the first brake member 44 to the block member 42. Exemplary fasteners include bolts, pins, a worm gear, or any similar means. As depicted in this figure, the first brake member 44 is flush against a surface 43 of the block member 42. Positioned between the inside of the block member 42 and grooves 66 of the first brake member 44 is at least one adjustment member 50. As discussed below, the adjustment members 50 allow the brake member 44 to be positioned at different positions relative to the block member 42 in order to adjust the braking force of the braking device 40.

Figure 3:
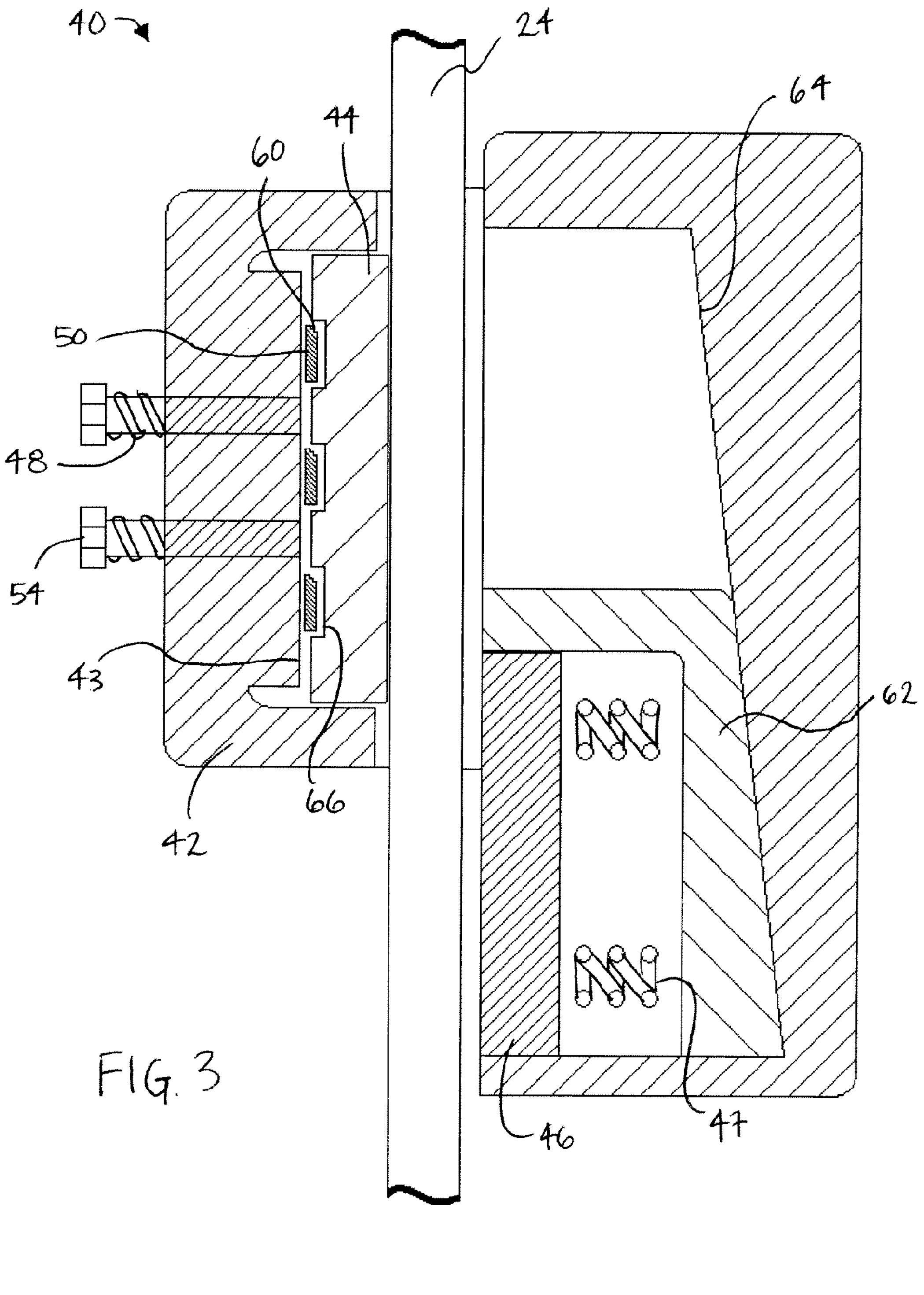
FIG. 3 illustrates an exemplary cross section of a braking device mid-adjustment
Figure 4:
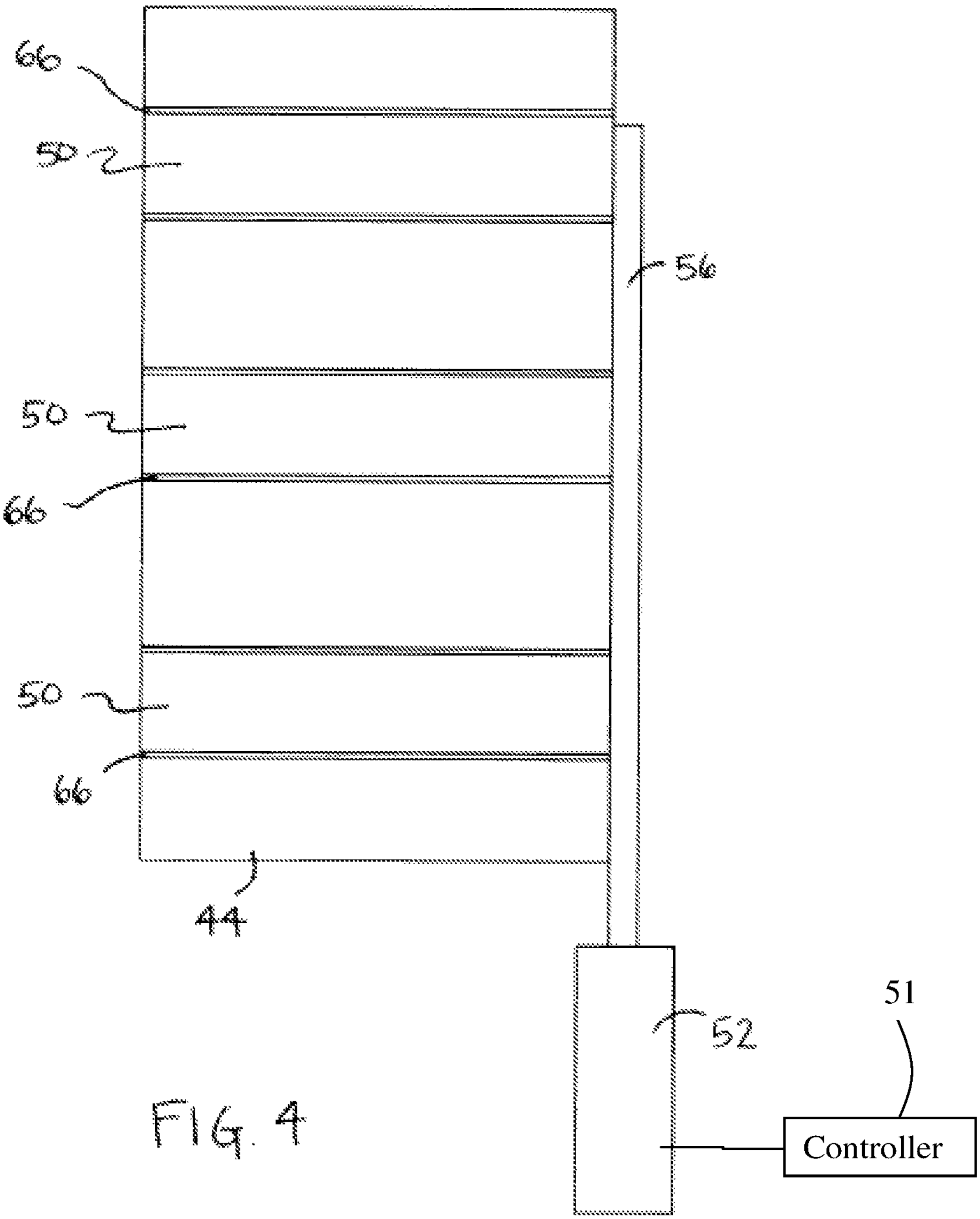
FIG. 4 illustrates an example of a top view of a first brake member and the adjustment members

The adjustment members 50 may be spacers, shims or any other similar spacing means. The adjustment member could allow for just a single adjustment of the brake member 44 relative to the block member 42 (e.g. the adjustment member 50 has a constant thickness) or allow multiple adjustments of the brake member 44 relative to the block member 42). In one example, the adjustment member 50 could have steps 60 with each step 60 of the adjustment member creating a unique distance between the first brake member 44 and the rail 24. In an alternate example, the adjustment member 50 can have a varying thickness to create even more possible distances than using the aforementioned steps 60. An exemplary adjustment control device 52 (see FIG. 4) can separate the first brake member 44 and the block member 42 by applying a force to fasteners 54. As depicted in FIG. 3, this movement creates a space between the first brake member 44 and the block member 42 sufficient to allow placement of the adjustment member 50 therebetween. A second adjustment control device 52 shifts the adjustment members into the desired location between first brake member 44 and the block member 42. The multiple adjustment control devices 52 which move the first brake member 44 and the adjustment members 50 respectively may be solenoids, actuators or some other electromechanical device. FIG. 4 portrays the top view of an exemplary first brake member 44 and its corresponding adjustment members 50 located within the grooves 66 of the first brake member. The plurality of adjustment members 50 can be connected to a common rod 56 which is controlled by an adjustment control device 52. The adjustment control device 52 moves the rod 56 to uniformly adjust the position of the adjustment members 50 with respect to the first brake member 44. This movement controls which part of the adjustment members 50 the first brake member 44 will contact if any. Alternatively, the adjustment members 50 could be separate (i.e. no common rod 56) and have one or more of its own adjustment control devices 52.

Figure 5:
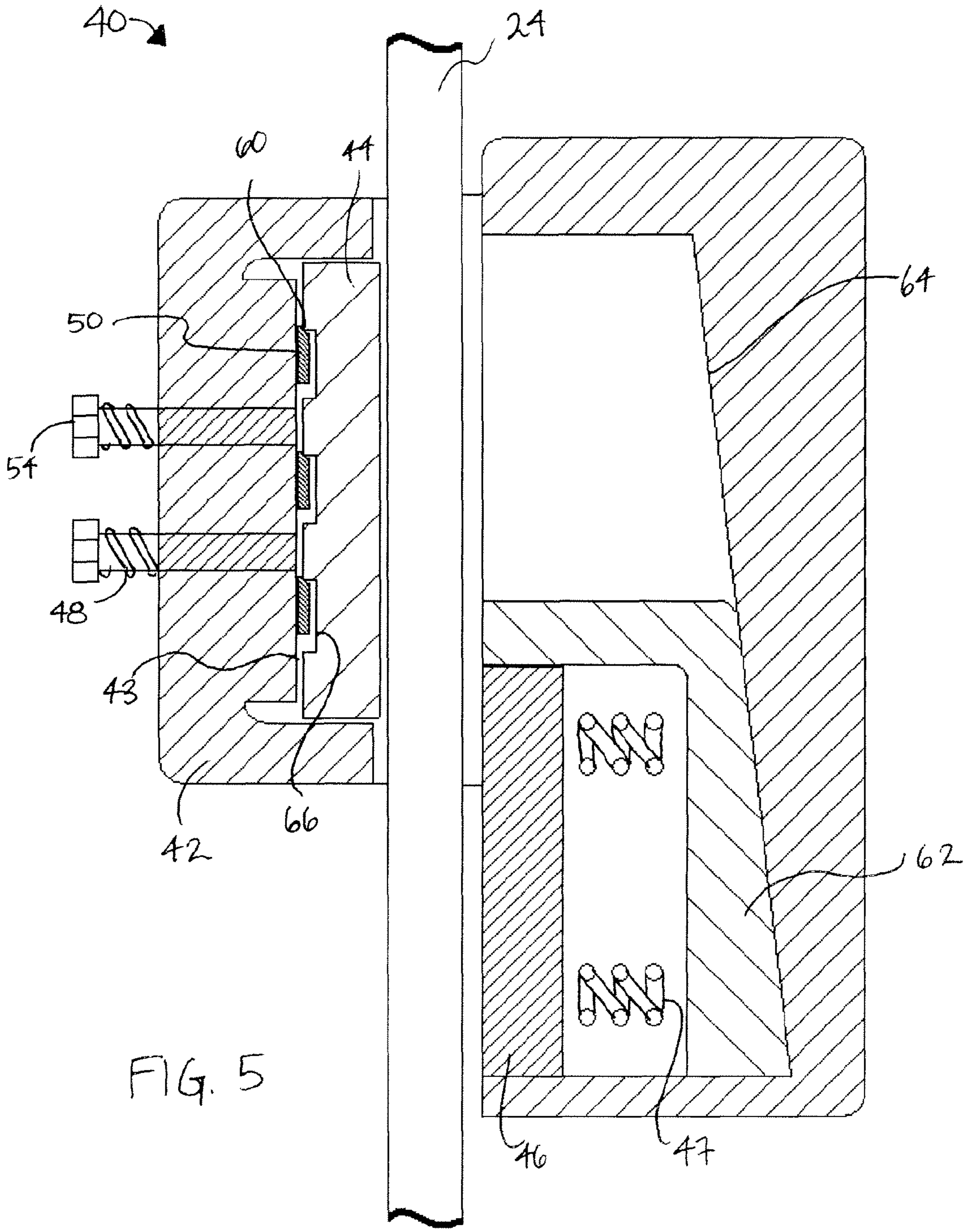
FIG. 5 illustrates an example braking device adjusted based on the load in the car

When the adjustment members 50 are positioned between the first brake member 44 and the block member 42, the distance, or gap, between the first brake member 44 and the rail 24, as portrayed in FIG. 5, is smaller than if the first brake member 44 sat against flush against the surface 43 of the block member 42 (i.e. the adjustment members 50 were located entirely within the groove 66). The gap between the first brake member 44 and the block member 42 ultimately determines the spring normal force exerted on the rail by the brake members 44, 46. Because this spring normal force stops the movement of the car 22, the distance between the first brake member 44 and the block member 42 can be adjusted to provide the ideal the spring normal force based on the actual load in the car 22 to provide a more comfortable stop for passengers. Also, by using a plurality of adjustment members 50, the distance between the first brake member 44 and the rail 24 can be more accurately adjusted and therefore the spring normal force closer to the ideal force based on the weight of the load in the car 22.

To assist with the adjustment of the gap between the first brake member 44 and the block member 42, for example to make an emergency stop less severe to passengers in the car 22, the system can first detect the load in the car for each run. Methods for detecting the load in the car may include, but are not limited to, measuring the load directly such as by using a load weighing device in the car, or indirectly such as by measuring the tension on the elevator tension members. A controller 51 receives the load information, determines a suitable gap between the first brake member 44 and the block member 42 based on the load information, and, if necessary, sends a signal to the adjustment control devices 52 to position the adjustment members 50. The controller 51 could be added to existing elevator components or a separate unit. Adjustment control device 52 applies a force to the fasteners 54 to displace the first brake member 44 towards the rail 24 and create a clearance between the first brake member 44 and the block member 42 to allow movement of the adjustment members 50 therein. Once the first brake member 44 has been spaced apart from the adjustment members 50 and the block member 42, a second adjustment control device 52 moves the plurality of adjustment members 50 into a position to create the desired spacing between the block member 42 and the first brake member 44. The adjustment control device 52 then releases its pressure on the fasteners 54, allowing the springs 48 to reposition the first brake member 44 adjacent to the block member 42 if possible, or adjacent to the adjustment members 50, thereby sandwiching the adjustment members 50 between the block member 42 and the first brake member 44. Thereafter, the elevator system 20 can perform its run.

What is claimed is:

1. An elevator safety comprising:

a first brake member having a braking surface for engaging a rail;

a block, the first brake member secured to the block;

a plurality of shims located between the first brake member and the block to control a gap between the first brake member and the block, the plurality of shims being positioned in the gap between the first brake member and the block;

the first brake member having grooves on a back surface, the back surface opposite the braking surface;

the plurality of shims being positioned in the grooves;

a first adjustment control device for adjusting the position of the first brake member relative to the block along an axis normal to a braking surface of the first brake member; and a second adjustment control device for changing the position of the plurality of shims relative to the first brake member along an axis parallel to a braking surface of the first brake member, the second adjustment control device moving the plurality of shims from a location entirely within the grooves to a position partially within the grooves.

2. The elevator safety according to claim 1, wherein the elevator safety is an asymmetrical safety.

3. The elevator safety according to claim 1, wherein the first brake member is a fixed wedge.

4. The elevator safety according to claim 1 wherein the first adjustment control device receives a control signal to adjust position of the first brake member relative to the block.

5. The elevator safety according to claim 4 wherein the control signal is responsive to a load in an elevator car.

6. The elevator safety of claim 5, further comprising a controller, wherein the controller receives a load signal indicative of the load and sends the control signal to the first adjustment control device responsive to the load signal.

* * * * *